US008924510B1

(12) United States Patent
Preston et al.

(10) Patent No.: US 8,924,510 B1
(45) Date of Patent: Dec. 30, 2014

(54) DIGITAL CONTENT MANAGEMENT SYSTEM AND PROCESS FOR THE PERSONALIZED SEARCH AND BROWSE OF A DIGITAL CONTENT CATALOG

(71) Applicant: CSG Media, LLC, Chicago, IL (US)

(72) Inventors: Geoff Preston, Chicago, IL (US); Kent Steffen, Chicago, IL (US)

(73) Assignee: CSG Media, LLC, Chicago, IL (US)

( * ) Notice: Subject to any disclaimer, the term of this patent is extended or adjusted under 35 U.S.C. 154(b) by 0 days.

(21) Appl. No.: 14/225,609

(22) Filed: Mar. 26, 2014

Related U.S. Application Data

(60) Provisional application No. 61/921,687, filed on Dec. 30, 2013.

(51) Int. Cl.
*G06F 15/16* (2006.01)
*G06Q 30/06* (2012.01)
*G06F 17/30* (2006.01)

(52) U.S. Cl.
CPC ...... *G06Q 30/0625* (2013.01); *G06F 17/30867* (2013.01); *G06F 17/30997* (2013.01); *G06F 17/301* (2013.01); *G06F 17/30017* (2013.01); *G06F 17/30864* (2013.01)
USPC ........... 709/217; 709/203; 709/205; 709/213; 709/220; 709/223; 709/231; 709/248

(58) Field of Classification Search
USPC .......... 709/203, 205, 217, 220, 223, 231, 248
See application file for complete search history.

(56) References Cited

U.S. PATENT DOCUMENTS

| 6,704,874 | B1 * | 3/2004 | Porras et al. ................... 726/22 |
| 7,694,115 | B1 * | 4/2010 | Porras et al. ...................... 713/1 |
| 8,126,722 | B2 * | 2/2012 | Robb et al. ..................... 705/1.1 |
| 8,156,074 | B1 * | 4/2012 | Multer et al. ................ 707/610 |
| 8,621,025 | B2 * | 12/2013 | Ridgard et al. .............. 709/207 |
| 2007/0250863 | A1 * | 10/2007 | Ferguson ........................ 725/46 |
| 2011/0269424 | A1 * | 11/2011 | Multer et al. ................. 455/411 |
| 2011/0276993 | A1 * | 11/2011 | Ferguson ....................... 725/30 |

* cited by examiner

*Primary Examiner* — Michael Y Won
(74) *Attorney, Agent, or Firm* — Miller, Canfield, Paddock and Stone; Mark L Maki; Jeffrey M Drake

(57) ABSTRACT

A digital content management system comprises a technology and process, which provides for personalized searching and browsing of digital content in a Digital Content Storefront based upon a real-time contextual merge of cloud-based Digital Content Catalog metadata and individualized, consumer-personalization Contextual Metadata, wherein the Contextual Metadata and Digital Content Catalog metadata are respectively delivered from a set of consumer web services provided at a managed datacenter in combination with a real-time elastic cloud cache, preferably provided by a Content Delivery Network. This system focuses on and expedites end-to-end delivery, caching, and real-time consumer application metadata merging to offer highly scalable and responsive contextual Catalog search and browse results.

30 Claims, 6 Drawing Sheets

DIGITAL CONTENT MANAGEMENT SYSTEM AND PROCESS FOR THE PERSONALIZED SEARCH AND BROWSE OF A DIGITAL CONTENT CATALOG

CROSS-REFERENCE TO RELATED APPLICATION

This application claims priority to and all benefits of U.S. Provisional Application No. 61/921,687 filed on Dec. 30, 2013, and entitled "Digital Content Management System And Process For The Personalized Search And Browse Of A Digital Content Catalog".

FIELD OF THE INVENTION

This invention relates to the real-time merging of Contextual Metadata about a digital subscriber with static Digital Content Catalog metadata associated with a Digital Content Catalog to create a personalized search and browse result set for a Digital Content Storefront that allows access to and the purchase, rental and subscription of content from the digital content catalog.

BACKGROUND OF THE INVENTION

Generally, a digital content catalog is stored in a database on a remote server, and contains metadata associated with various types of digital content. The digital content may be digitized forms of various types of products such as movies, videos, music, literature and other documents, games, applications and other collections of data. The digital content in this catalog may also relate to physical products and other hard goods, which products might be available for purchase, wherein the digital content catalog contains digitized information relating to these physical products.

The digital content catalog is used by a potential consumer referenced herein as a digital subscriber, who accesses the digital content catalog through a remote, computerized access device, which may be a computer or other digital device such as a tablet, smartphone, game console, Blu-ray Player/Recorder, internet-enabled television or any other similar access device. The access device contains a processor which runs a consumer storefront application, which can be a native application, an HTML application accessed by a browser or the like. The storefront application displays a computerized storefront associated with the digital content catalog.

Generally, the digital content catalog and the metadata associated therewith is stored at and within a managed datacenter containing master storage devices which include digital storage media that is maintained on servers or other similar storage devices. The data stored on the servers is accessed through a data connection, preferably a web-based data connection, which allows communications between the remote access device and the master storage device.

Entitlements for digital content can be obtained through various transactions, and for example, can be rented, purchased or subscribed to through the digital content storefront and its consumer storefront application by the digital subscriber. In this regard, the digital subscriber can search and access information from the digital content catalog in order to browse and select specific digital content to which the digital subscriber wishes to obtain entitlements. The consumer storefront application allows this search, access and subscriber capability through the remote access device.

Typically, a remote access device accesses and searches, and then can acquire entitlements to the digital content catalog directly from the managed datacenter. However, known systems of such direct distribution of digital content can be slower and less reliable, particularly where bandwidth to the managed datacenter is restricted or overloaded.

It is an object of the invention to provide improved access to and distribution of digital content from a digital content catalog.

SUMMARY OF THE INVENTION

The present invention provides a technology and a process for delivering personalized search and browse results based on the a real-time combination and merging of cached Digital Content Catalog metadata with Contextual Metadata associated with the Digital Subscriber. This Contextual Metadata can include information about the Digital Subscriber's entitlements, recommendation set, geography, available pricing options, upsells, wish lists, favorite lists, parental control settings, and content bookmarks as well as other personalized attributes of the Digital Subscriber. This Contextual Metadata is obtained by calling Web Services to evaluate configured Content Targeting Rules for better accessing Contextual Metadata.

More particularly, better discovery results can be achieved by presenting a view of the Digital Content Catalog that is most relevant to a Digital Subscriber. This reliance can be achieved through personalization of search and browse results based on a Digital Subscriber's Contextual Metadata, which can comprise location and other personal attributes understood about the Digital Subscriber. These personal attributes may be specifically known about the particular Digital Subscriber, or even, generalized estimations of traits which might apply to this Digital Subscriber based upon other known information.

To facilitate the delivery of personalized browse and search results, static Digital Content Catalog metadata from the managed datacenter can be merged in real-time with Contextual Metadata about a Digital Subscriber to filter content and provide personalized search and browse results to the Digital Content Storefront.

In accordance with this invention, Digital Content is configured in a Digital Content Catalog maintained on digital media storage devices at a direct managed datacenter. Also, in this Digital Content Catalog, Content Targeting Rules are created with the purpose of providing personalized context for the Digital Subscriber in order to filter the Digital Content Catalog based on personalized data or attributes about the Digital Subscriber using the storefront. Digital Content Catalog metadata is stored in the Digital Content Catalog and available to the Digital Content Storefront by the web-based connection between the remote access device being used by the Digital Subscriber and managed datacenter. When a search or other discovery method is conducted on the remote access device, the system of the invention provides the access device and the Consumer Storefront Application of the Digital Content Storefront with the Digital Content metadata and the Contextual Metadata associated with the Digital Subscriber, which metadata is merged and the result set filtered to provide a personalized display of information in the Storefront.

The Contextual Metadata preferably is stored in a Digital Subscriber Attribute Database located at the same managed datacenter which contains the Digital Content Catalog. However, the Digital Subscriber Attribute Database may be stored on servers at another datacenter located remote from the storage site for the Digital Content Catalog.

The invention also includes at least one Content Delivery Network (CDN) which is maintained separate from each managed datacenter that maintains the Digital Content Catalog and/or the Digital Subscriber Attribute Database. While one CDN may be used in a particular geographic location to serve all Digital Subscribers, more preferably, multiple CDNs may be provided at different geographic locations within a geographic area, such as North America, or at different locations worldwide, such as in North America, Europe and Asia Pacific which thereby locates the CDN geographically closer to the Digital Subscribers. A data request is directed to the appropriate CDN by the consumer storefront application depending upon the particular physical location of the Digital Subscriber.

The CDN maintains a cached copy of the Digital Content Catalog such that the Digital Content Storefront directly obtains the metadata associated with the Digital Content Catalog directly from the CDN, which provides a real-time elastic cloud cache for the delivery of the Digital Content metadata to the consumer storefront application. If the requested data is not present or up to date in the CDN, the CDN redirects or forwards the data request to the appropriate managed datacenter which supplies the real-time updated Digital Content Catalog metadata to the CDN.

In parallel with retrieving the Digital Content Catalog metadata from the CDN, the consumer storefront application also requests and obtains the Contextual Metadata associated with the Digital Subscriber from the managed datacenter.

The present invention exhibits various features and advantages over known content management systems and processes.

A feature of this invention is for the Digital Content Catalog to be configured in a Catalog administration tool, which creates and updates a digital content database, to be stored in the digital content database in a managed datacenter and a copy of the Digital Content metadata propagated to at least one Content Delivery Network (CDN).

Also, a feature of this invention is for Targeting Rules to be configured in the Catalog administration tool, and stored in the digital content database in the managed datacenter.

Another feature of this invention is for a Digital Content Storefront to request a filtered result set for searching and browsing the Digital Content Catalog.

Still further, a feature of this invention is for the search and browse algorithm of the Digital Content Storefront to request a real-time merge of cached Digital Content Catalog data from the CDN with personalized Contextual Metadata about a Digital Subscriber from the managed datacenter and based on this metadata, filter the Digital Content Catalog result set in real-time within the consumer storefront application or browser session and present the personalized result set to the Digital Subscriber on the access device.

Other objects and purposes of the invention, and variations thereof, will be apparent upon reading the following specification and inspecting the accompanying drawings.

Figure 1:
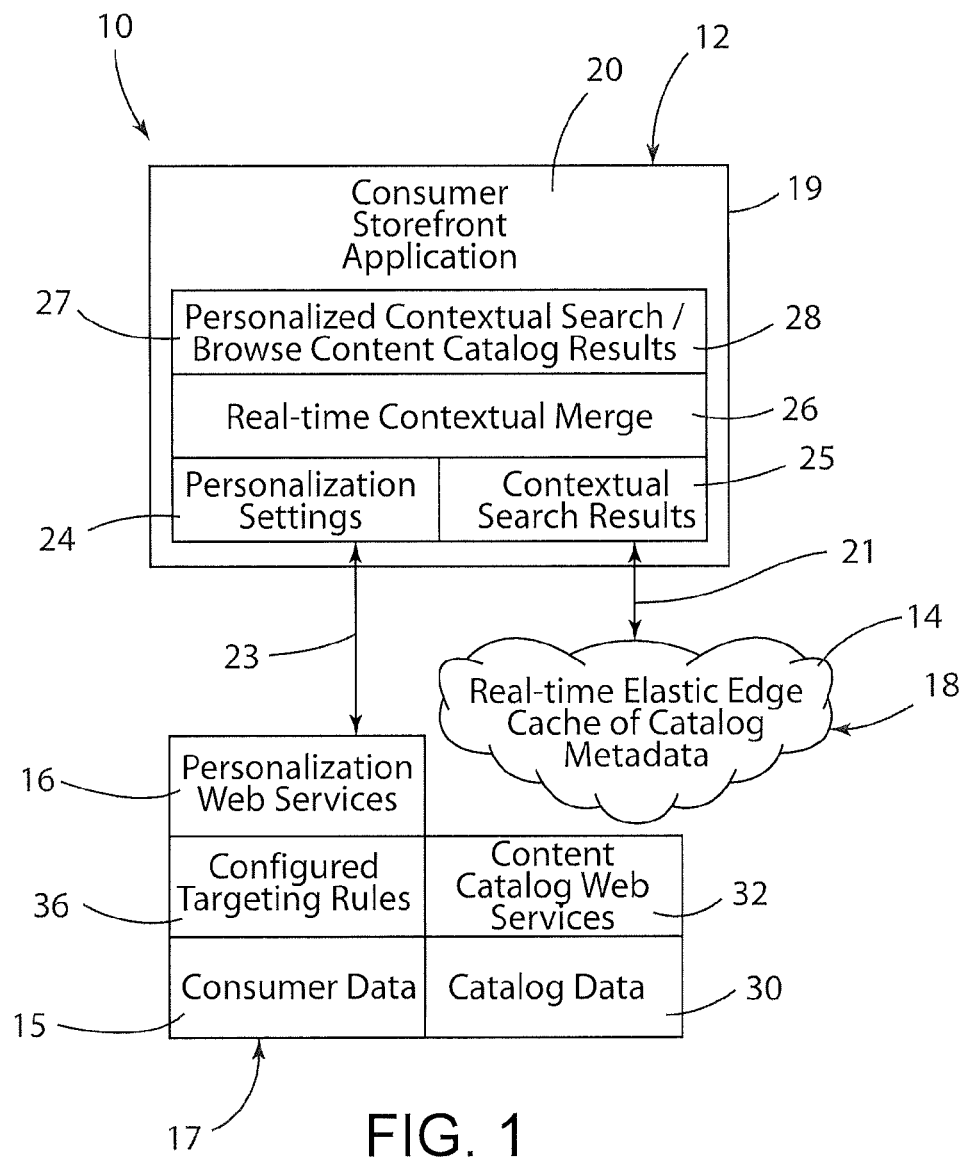
FIG. 1 provides an overview of the components within the scope of the invention which comprises a Digital Consumer Storefront Application, an Elastic Edge Cache of Digital Content Catalog in a Content Delivery Network and a managed datacenter with Targeting Rule definition.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
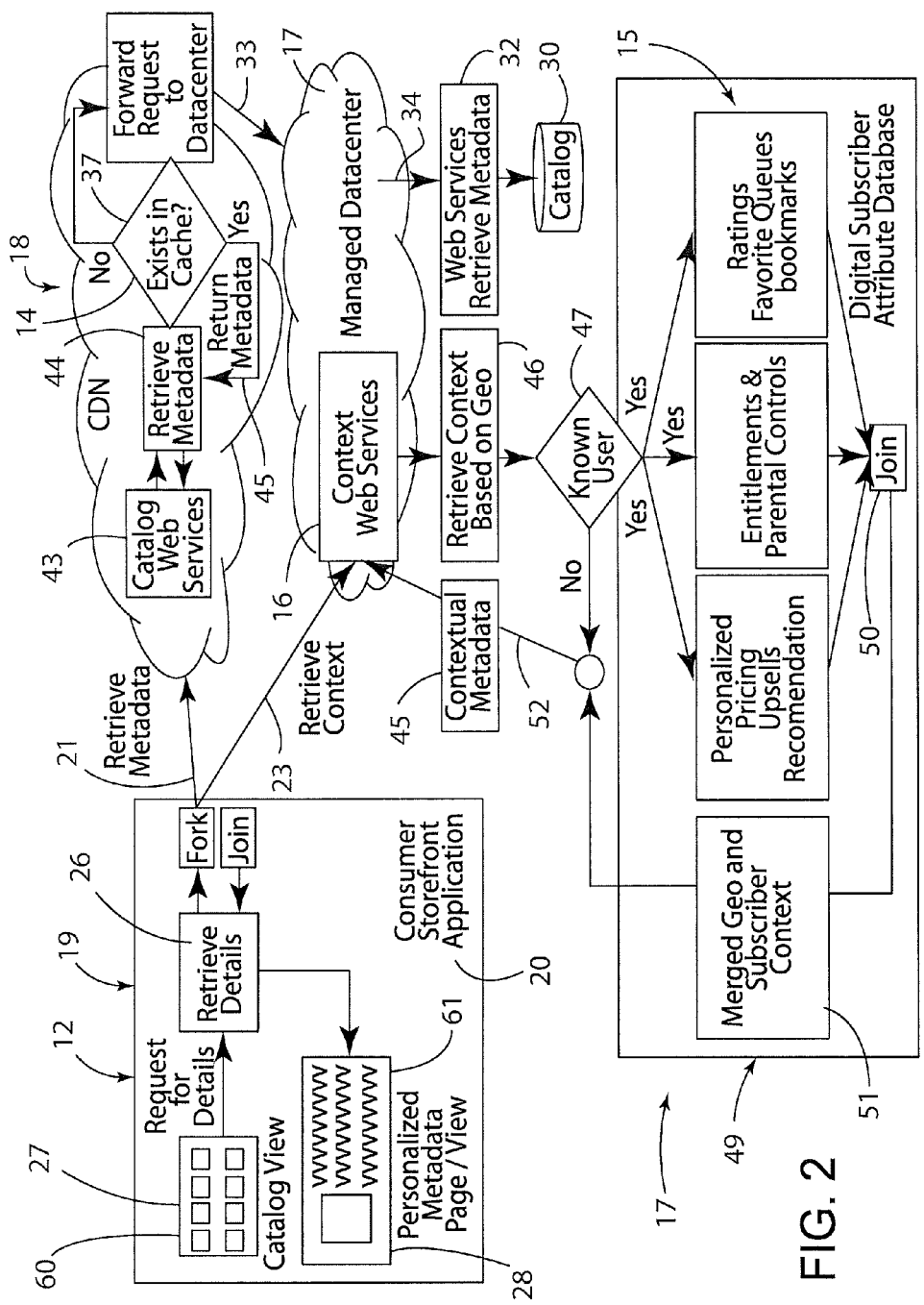
FIG. 2 is a flow diagram of the metadata from definition through delivery to a Digital Content Storefront.

Generally referring to FIGS. 1 and 2, the invention relates to a digital content management system 10 comprising a technology and process. The content management system 10 provides for personalized searching and browsing of digital content from a Digital Content Storefront 12 based upon a real-time contextual merge of cloud-based Digital Content Catalog metadata 14 and individualized, consumer-personalized Contextual Metadata 45, wherein the Contextual Metadata 45 and Digital Content Catalog metadata 14 are respectively delivered from a set of consumer personalization web services 16 provided at a managed datacenter 17 in combination with a real-time elastic cloud cache, preferably provided by a Content Delivery Network 18.

The Digital Content Storefront 12 operates on a computerized remote access device 19, which includes a processor that runs a Consumer Storefront Application 20, wherein the Consumer Storefront Application 20 may be provided by a software application or web site viewed through a browser on the access device 19. The static Digital Content Catalog metadata 14 is requested by and delivered to the Consumer Storefront Application 20 via restful web services through a web-based connection 21 with the CDN 18 wherein a URL request is served by the CDN 18.

Generally, the CDN 18 stores a cache copy of Digital Content Catalog metadata 14 and is configured to origin to and communicate with the real-time, personalization web services 16 if the Digital Content Catalog metadata 14 is not cached on the CDN 18. If there are Digital Content Catalog updates that are not yet provided to the CDN 18 such that the updated metadata invalidates the CDN cache metadata 14, the personalization Web Services 16 still provide near real-time updates of the Digital Content metadata 14.

In parallel with the request for static Digital Content Catalog metadata 14 via the CDN 18, the Consumer Storefront Application 20 makes a request for real-time personalization Web Services 16 to obtain personalized data or Contextual Metadata 45 for the individual Digital Subscriber through web based connection 23. The Contextual Metadata 45 is derived from the consumer data 15 maintained at the datacenter 17. This personalized Contextual Metadata 45 comprises various forms of data including entitlement details, purchase information, ratings, parental control filtering and settings, available upsells, and recommendation sets. This Contextual Metadata 45 can also include other information about the Digital Subscriber including geography, available pricing options, wish lists, favorite lists, and content bookmarks as well as other personalized attributes of the Digital Subscriber. These personal attributes preferably are details specifically known about the particular Digital Subscriber, but can be generalized estimations of traits which might apply to this Digital Subscriber based upon other known information. The personalization Web Services 16 then supplies the Contextual Metadata 45 to the Consumer Storefront Application 20 through the connection 23.

As shown in FIGS. 1 and 2, the Consumer Storefront Application 20 therefore receives two inputs, namely the Contextual Metadata 45 relating to the specific Digital Subscriber and the Digital Content Catalog metadata 14. The two responses are received in the Personalization Settings 24 and the Contextual Search Results 25 and then synchronized or merged in a real-time contextual merge 26 in the Consumer Storefront Application 20. The Consumer Storefront Application 20 thereby has a display which allows the Digital Subscriber to perform and view a Personalized Contextual Search 27 and receive and browse Content Catalog Results 28. The Content Catalog Results 28 provide a contextual and personalized result set of metadata, selling data, and interaction data, which is unique to the individual, i.e. the Digital Subscriber, using the Consumer Storefront Application 20.

Entitlements for Digital Content can be rented, purchased or subscribed to through the Digital Content Storefront 20 by the Digital Subscriber. In this regard, the Digital Subscriber can search and access information from the Digital Content Catalog 30 through the CDN 18 in order to browse and select specific Digital Content to which the Digital Subscriber wishes to obtain entitlements. The Consumer Storefront Application 20 allows this search, access and subscriber capability through the remote access device 19.

The digital content management system 10 of the invention is therefore usable to speed the delivery of personalized search and browse results to the Consumer Storefront Application 20.

In accordance with this system 10 of the present invention, Digital Content can be filtered to create a highly scalable, real-time, personalized search and browse result set 28 based on merging cache Digital Content Catalog Metadata 14 with personalized Contextual Metadata 45 for a Digital Subscriber.

More particularly referring to FIG. 2, the Digital Content is stored in the form of a Digital Content Catalog 30 maintained on digital media storage devices at a content direct managed datacenter 17. In comparison to the access devices 19, the Digital Content Catalog 30 is stored in a database on a server that is remote from the access device 19, while the access devices 19 are personally associated with potential customers or consumers of the Digital Content. The Digital Content Catalog 30 contains the metadata associated with various types of Digital Content, which Digital Content may be digitized forms of a wide variety of types of products such as movies, videos, music, literature and other documents, games, applications and other collections of data. The Digital Content in the Digital Content Catalog 30 may also relate to physical products and other hard goods, which products might be available for purchase or rental, wherein the Digital Content Catalog 30 may contain digitized information, descriptions or abstracts relating to these physical products.

The managed datacenter 30 contains master storage devices which include digital storage media that is maintained on servers or other similar storage devices. The Digital Content Catalog 30 is managed by Catalog Web Services 32 (FIGS. 1, 2 and 5) which are provided by suitable processors and servers in the managed datacenter 17. The Digital Content Catalog data is stored on the servers and may also be provided to the CDN 18 through data connections 33 and 34 (FIGS. 2 and 5), which preferably are web-based data connections that connect the managed datacenter 17 with the CDN 18.

Figure 3:
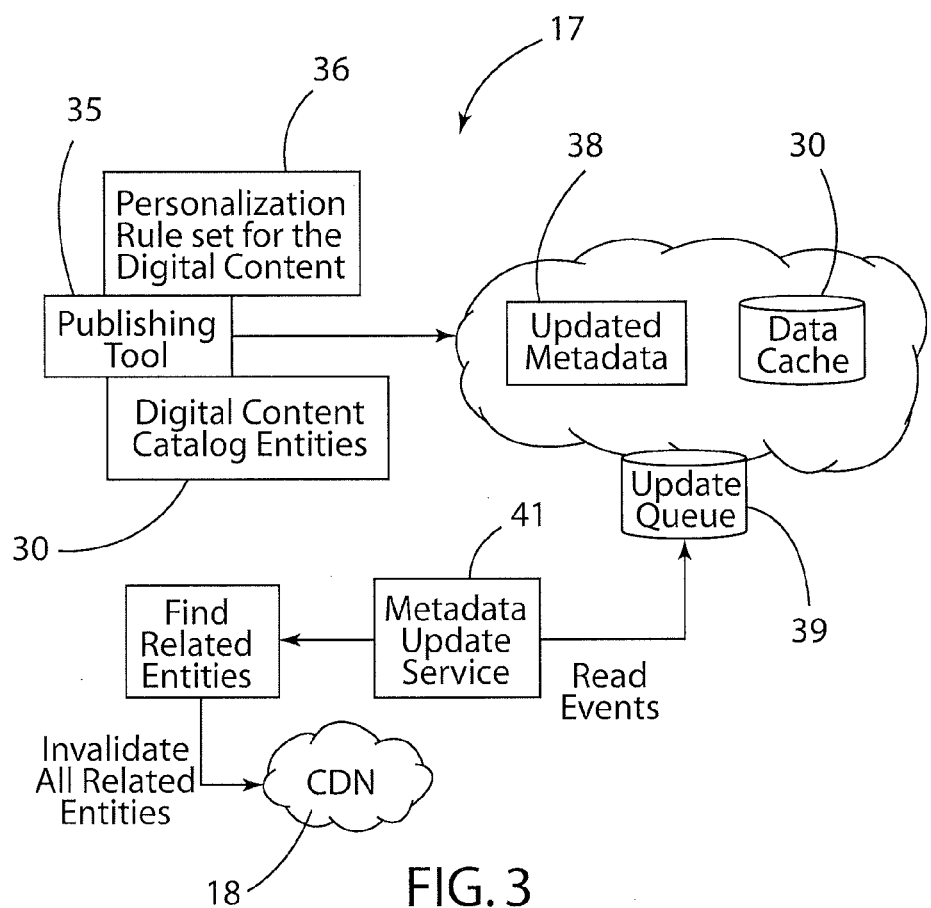
FIG. 3 outlines the configuration of Digital Content Metadata and Targeting Rules for the Digital Content Catalog and the metadata's update process to a Content Delivery Network.

The Content Catalog metadata of the Digital Content Catalog 30 is ingested or configured through a computer-based content administration or publishing tool 35 shown in FIG. 3 and published to the Digital Content Catalog 30 managed in the datacenter 17. The publishing tool 35 is performed on a processor associated with the datacenter Web Services 32 and creates the original Digital Content Catalog 30 as well as issues updates and changes to the Catalog 30.

As will be described further herein, Targeting Rules 35 are also supplied through the configuration process of FIG. 3. The Targeting Rules 35 are provided to filter Digital Content availability based on criteria such as requesting geography, configured cross and upsells for the digital content, entitlement rules such as the presence of specific rental, purchase or subscription characteristics for a Digital Subscriber, derived peer affinity group recommendations created from systematic grouping of Digital Subscribers with similar browse, purchase and content rating characteristics, the presence of purchased products for a Digital Subscriber, configured wish lists and favorite lists of a Digital Subscriber, and configured parental control settings of a Digital Subscriber. These Targeting Rules 35 are associated with the Digital Content Catalog 30.

As referenced above, at least one CDN 18 is provided separate from each managed datacenter 17 that maintains the Digital Content Catalog 30. While one CDN 18 may be used in a particular geographic location to serve all Digital Subscribers, it may be preferred that multiple CDNs 18 may be provided at different geographic locations within a geographic area, or at different locations worldwide, which thereby locates the CDN 18 geographically closer to the Digital Subscribers.

Each CDN 18 maintains a cached copy of the Digital Content Catalog as a Cached Digital Content Catalog 37 such that the Digital Content Storefront 20 directly obtains the Digital Content Catalog metadata 14 stored in that particular copy of the cached Digital Content Catalog 37. Therefore, the CDN 18 provides a real-time elastic cloud cache for the delivery of the Digital Content metadata 14 to the Consumer Storefront Application 20. The Cached Digital Content Catalog 37 is updated by the Web Services 32.

While the Cached Digital Content Catalog 37 may contain the same metadata in all of several CDNs 18, duplication of the Cached Digital Content Catalog 37 is not required. Depending upon the geographic location being served by a particular CDN 18, there may be geographic preferences for some Digital Content of the Digital Content Catalog 30 but not all. As such, it may be desirable to only store a portion of the total Digital Content in a particular Cached Digital Content Catalog 37 since the cached copy may be updated and expanded if there is an increase in demand for an omitted portion of the cached copy.

The method of publishing this Digital Content Catalog metadata 14 to the Cached Digital Content Catalog 37 allows for updating of changes in metadata, wherein the updates are initiated from the datacenter 17 and distributed to each CDN 18 where appropriate. The publishing tool 35 can maintain the Content Direct Catalog 30 as well as updated metadata 38 and the datacenter 17 will queue metadata changes in an update queue 39 so that the changes can be accessed by Metadata Update Service 41 (FIG. 3) controlled through the Web Services 32. The Metadata Update Service 41 can communicate with each CDN 18 and find each of the related entities within a CDN-cached version of the Catalog 37 and invalidate any catalog metadata entitles which have been changed. As such, any updated metadata entities must be fetched from the cache of the managed Digital Content Catalog 30 and distributed to the CDNs 18 before this updated metadata can be used by a Digital Content Storefront 12.

In this manner, the managed datacenter 17 stores the Digital Content Catalog 30 and controls updates of Catalog metadata to this managed Digital Content Catalog 30. The datacenter 17 also distributes the metadata and any updates to each CDN 18 which is stored as a cached copy of the Digital Content Catalog 37 and is updated where necessary by the Metadata Update Service 41 (FIG. 3). As such, one or more copies of the Digital Content can be maintained at one or more geographic locations and these multiple locations can be managed by the datacenter 17. It also is possible to manage multiple CDNs 18 through multiple datacenters 31.

Figure 5:
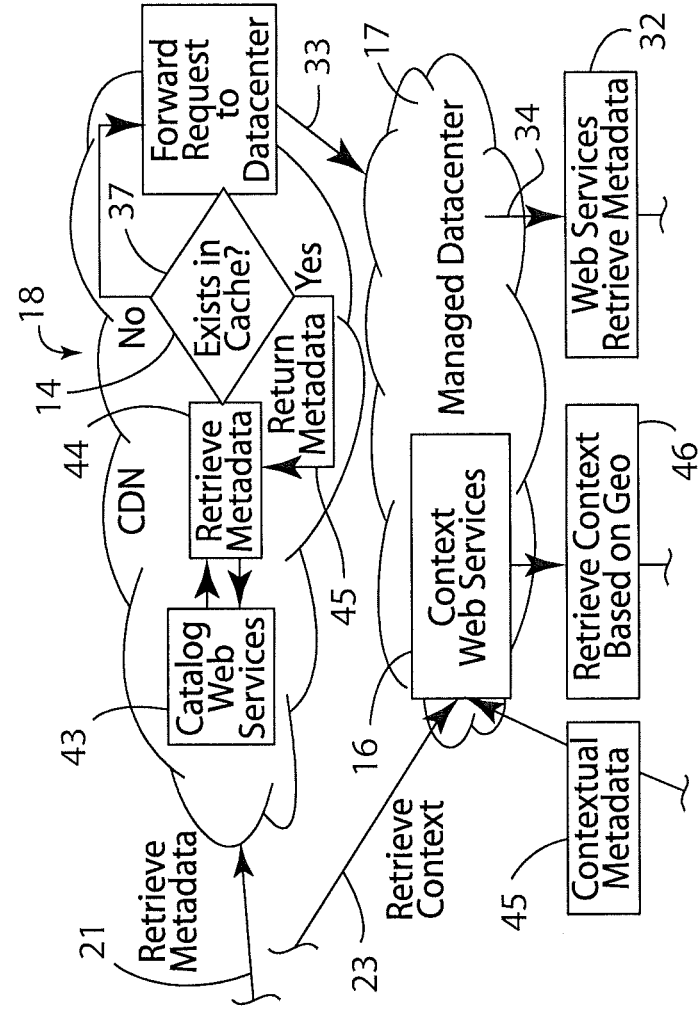
FIG. 5 is an enlarged diagram of the Content Delivery Network and a Content Direct Managed Datacenter.

Next as seen in FIG. 5, the Digital Content Storefront 12 can request applicable metadata 14 from the cached Digital Content Catalog 37 through an edge cached Content Delivery Network 18 through a REST-based Web Service 43. The Web Services 43 operate to retrieve metadata at step 44 and if the requested metadata exists in the cached Catalog 37, this metadata is returned to the Web Services 43 for subsequent retrieval by the Digital Content Storefront 12 through connection 21.

If the requested metadata entities are not available in the Content Delivery Network edge cache 37 or the entity has been invalidated in the Content Delivery Network edge cache 37 due to an update, the requested metadata will be fetched from a managed datacenter 17 through a Web Service request indicated by connection 33, which will return the updated Digital Content Catalog entities to the Content Delivery Network 18. The method for the retrieval of these Catalog entities is to forward a request for the Digital Content Catalog entities to the Web Services 32 provided by application servers in the managed datacenter 17.

This method will increase the scalability and availability of Digital Content Catalog requests from the Digital Content Storefront 12 to the Content Delivery Network 18 as the Content Delivery Network 18 can deliver an edge cached version of the Catalog 37. This method also ensures that changes to the Digital Content Catalog 30 are populated out to the Content Delivery Network 18 and the cached Catalog 37 as changes are made to the managed copy of the Digital Content Catalog 30.

Figure 6:
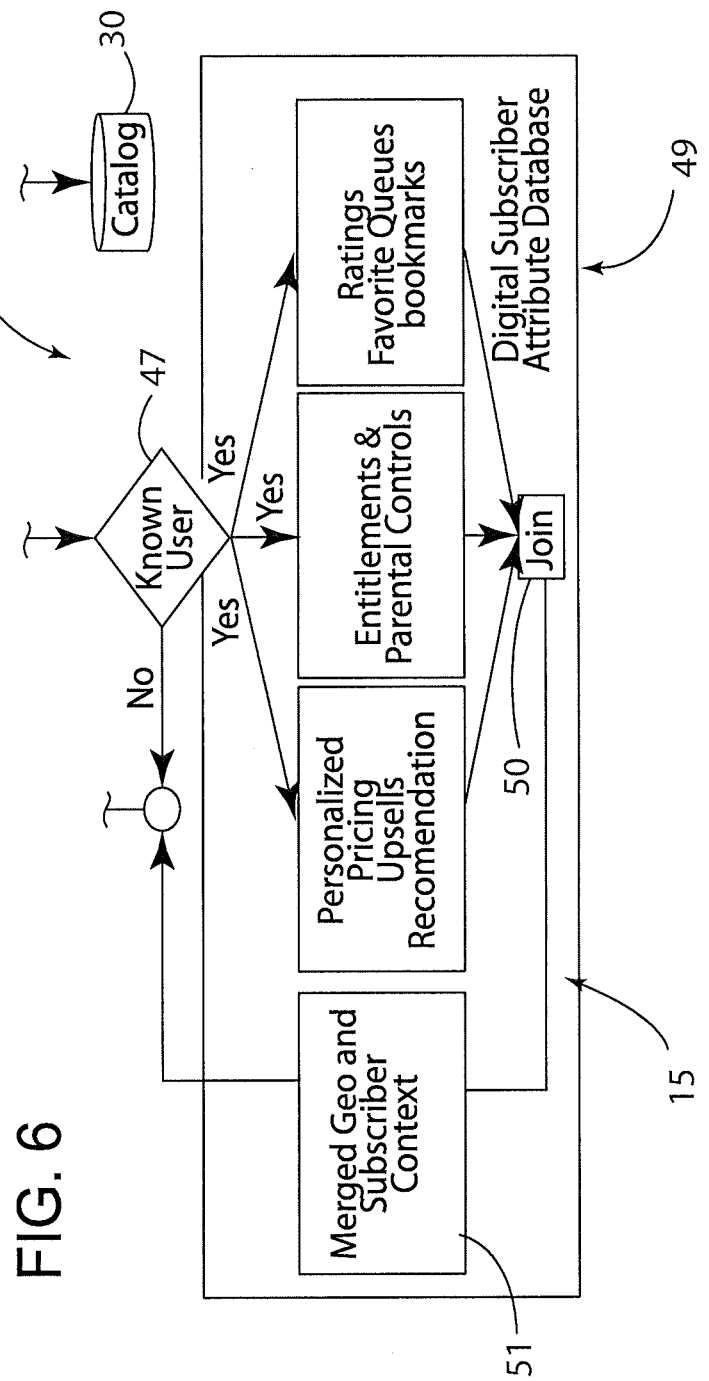
FIG. 6 is an enlarged diagram of a Digital Subscriber Attribute Database.

At the same time the Digital Content Storefront 12 makes a request for Digital Content Catalog 37, it makes a Web Services request for Contextual Metadata 45 as seen in FIGS. 1, 2 and 5. Contextual Metadata 45 is derived from several properties passed in through the session of the request 23. As seen in FIGS. 2 and 6, if the IP location of the request 23 is understood, the Contextual Metadata 45 will be evaluated to include the requesting IP address at processing step 46.

If the Digital Subscriber is known at the time of the request at processing step 47, the Digital Subscriber session ID will also be passed so that Targeting Rules 36 can take this information into consideration when evaluating its rules. This input data is passed to Personalization or Context Web Services 16 provided through the managed datacenter 17 and the application servers thereof. The input attributes are used to evaluate the configured targeting rules to return the appropriate Contextual Metadata 45.

The personalized Digital Subscriber information or consumer information 15 which supplies the Contextual Metadata 45 preferably is stored in a Digital Subscriber Attribute Database 49 located at the same managed datacenter 17 which contains the Digital Content Catalog 30. However, the Digital Subscriber Attribute Database 49 may be stored on servers at another datacenter located remote from the storage site for the Digital Content Catalog 30.

If the Digital Subscriber is a known user at step 47 (FIGS. 2 and 6), the respective consumer information and data 15 associated with that Digital Subscriber is retrieved from the Database 49, joined together at step 50 and then merged with the geographic information at step 51. Contextual Metadata 45 is then transmitted at step 52 to the Web Services 15 and returned through connection 23.

Figure 4:
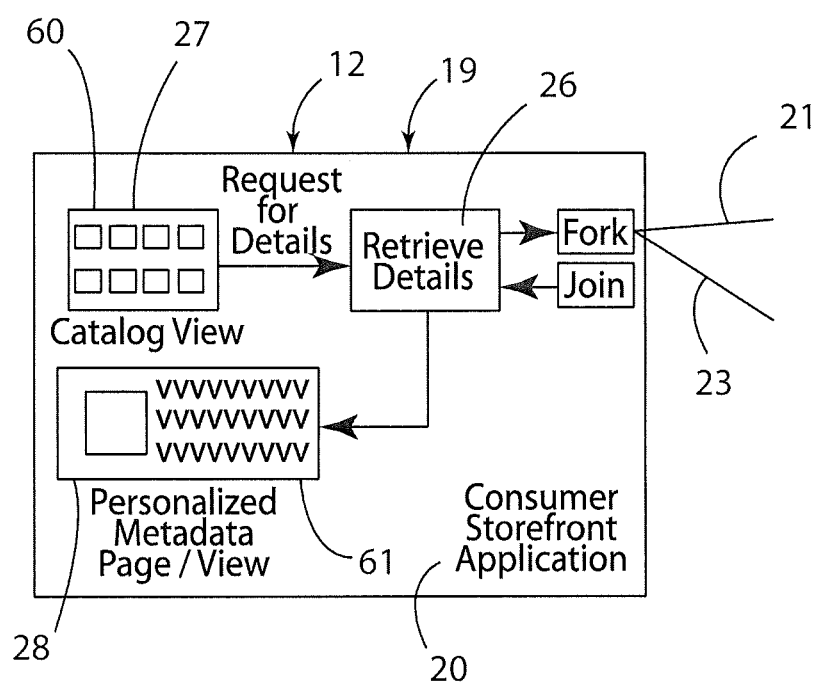
FIG. 4 is an enlarged diagram of the Digital Content Storefront.

The Contextual Metadata 45 is returned to the calling Digital Content Storefront application 20 and merged in real-time through a Real-time Contextual Merger 26 (FIGS. 1 and 2) to filter the Content Catalog metadata and provide a personalized set of search and browse results 28 to the Digital Content Storefront 12 (FIGS. 2 and 4).

The Digital Content Storefront 12 is provided through any suitable access device 19 provided geographically and physically remote from the datacenter 17 and the CDN 18. The access device 19 is one of many different access devices 19 that connect to and use the content distribution system 10 of the invention. As the Consumer Storefront Application 20 is used, a video display is typically provided which would display a search screen or page 50 from which the Personalized Contextual Search 27 is performed. This affects a request for digital content metadata 14 to the CDN 18 and for the Contextual Metadata 45 to the datacenter 17. The metadata details are then retrieved and merged at step 26 and displayed on a search page 51 as Content Catalog Results 28. The Digital Subscriber can then browse these results and purchase, license or obtain entitlements to any desired digital content or the products represented thereby.

This distribution system 10 provides various advantages. For example, the managed Digital Content Catalog 30 can be configured in a Catalog administration or publishing tool 35, which creates and updates the managed digital content database. The managed Digital Content Catalog 30 can be stored in a digital content database in a managed datacenter 17 and a copy of the Digital Content metadata propagated to at least one Content Delivery Network (CDN) 18 as a cached Digital Content Catalog 37.

Also, a feature of this invention is for Targeting Rules 36 to be configured in the Catalog administration tool 35, and stored in the digital content database in the managed datacenter 17.

Another feature of this invention is for a Digital Content Storefront 12 to request a filtered result set for searching and browsing the Digital Content Catalog 37.

Still further, the search and browse algorithm of the Digital Content Storefront 12 can request a real-time merge of cached Digital Content Catalog data 14 from the CDN 18 with personalized Contextual Metadata 45 about a Digital Subscriber from the managed datacenter 17 and based on this metadata 45, filter the Digital Content Catalog result set 28 in real-time within the Consumer Storefront Application 20 or the browser session thereof and present the personalized result set 28 to the Digital Subscriber on the access device 19.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A digital content management system comprising:
   a managed datacenter having a managed digital content catalog containing metadata relating to digital content which may be acquired by a digital subscriber, said managed datacenter having access to a digital subscriber attribute database containing personalized information on digital subscribers, said managed digital content catalog and said digital subscriber attribute database respectively being stored on digital storage media and being accessed by respective managed catalog web services and context web services provided through said managed datacenter;
   at least one content delivery network (CDN) remote from said managed datacenter on which is stored a cached digital content catalog that corresponds to said managed digital content catalog and is updated by said managed datacenter, said CDN including catalog web services for processing requests for metadata from said cached digital content catalog;
   an access device located remote from but having respective web-based connections with each said CDN and said managed datacenter, said access device having a digital content storefront application which is usable by a digital subscriber to perform a personalized contextual search of digital content, said access device requesting and receiving digital content catalog metadata from said cached digital content catalog through said catalog web services of said CDN, and requesting and receiving contextual metadata about said digital subscriber from said digital subscriber attribute database through said context web services of said managed datacenter;
   said access device merging said contextual metadata and said digital content catalog metadata to define content catalog search results which are provided to said digital subscriber through said access device.

2. A digital content management system according to claim 1, wherein said digital content comprises digitized forms of at least one type of product comprising at least one of movies, videos, music, literature, documents, games, software applications, collections of data, physical products and hard goods, which products are available for purchase by a digital subscriber.

3. A digital content management system according to claim 1, wherein said contextual metadata includes information relating to said digital subscriber including at least one of entitlements, a recommendation set, geographic location, available pricing options for said digital content, upsells, wish lists, favorite lists, parental control settings, content bookmarks and personalized attributes of a digital subscriber.

4. A digital content management system according to claim 3, wherein entitlements for said digital content are available for renting, purchasing or subscription through said digital content storefront application.

5. A digital content management system according to claim 1, wherein one said CDN is provided proximate a particular geographic location to serve all digital subscribers, or multiple said CDNs are provided at different geographic locations to locate each said CDN geographically closer to a respective subgroup of said digital subscribers.

6. A digital content management system according to claim 5, wherein a data request is directed to one said CDN by said digital content storefront application depending upon a particular physical location of said digital subscriber.

7. A digital content management system according to claim 5, wherein each said CDN maintains a cached copy of said cached digital content catalog such that said digital content storefront directly obtains said digital content catalog metadata directly from said CDN.

8. A digital content management system according to claim 1, wherein if metadata requested from said digital content storefront application is not present or up to date in said cached digital content catalog of said CDN, said CDN forwards a data request through a web based connection to said managed datacenter which supplies real-time updated catalog metadata to said CDN which said CDN uses said updated catalog metadata to respond to said request from said digital content storefront application.

9. A digital content management system according to claim 1, wherein said digital content storefront application requests and receives said contextual metadata from said managed datacenter in parallel with requesting and receiving said digital content catalog metadata from said CDN.

10. A digital content management system according to claim 9, wherein said contextual metadata is stored in said digital subscriber attribute database located at the same said managed datacenter which contains said digital content catalog or in a different managed datacenter.

11. A digital content management system according to claim 9, wherein said contextual metadata is requested by said digital content storefront application by calling said context web services which process and evaluate configured content targeting rules stored in said managed datacenter.

12. A digital content management system according to claim 11, wherein said content targeting rules are stored in said managed datacenter and applied in response to a request from said digital content storefront application which said content targeting rules provide personalized context for a digital subscriber to filter said digital content catalog based on personalized data about said digital subscriber using said digital content storefront application.

13. A process for operating a digital content management system comprising the steps of:
   providing a managed datacenter having a managed digital content catalog containing digital content metadata relating to digital content which may be acquired by a digital subscriber, said managed datacenter having access to a digital subscriber attribute database containing personalized information on digital subscribers;
   storing said managed digital content catalog and said digital subscriber attribute database on digital storage media and accessing said managed digital content catalog and said digital subscriber attribute database respectively through managed catalog web services and context web services provided through said managed datacenter;
   providing at least one content delivery network (CDN) remote from said managed datacenter on which is stored a cached digital content catalog that corresponds to said managed digital content catalog and is updated by said managed datacenter, said CDN including catalog web services for processing requests for metadata from said cached digital content catalog;
   providing an access device located remote from but having respective web-based connections with each said CDN and said managed datacenter;
   operating a digital content storefront application on said access device which is usable by a digital subscriber to perform a personalized contextual search of digital content, which includes the steps of said access device requesting and receiving digital content catalog metadata from said cached digital content catalog through said catalog web services of said CDN, and said access device requesting and receiving contextual metadata about said digital subscriber from said digital subscriber attribute database through said context web services of said managed datacenter; and said access device merging said contextual metadata and said digital content catalog metadata to define content catalog search results which are provided to said digital subscriber through said access device.

14. A process for operating a digital content management system according to claim 13, wherein each said CDN maintains a cached copy of said cached digital content catalog, said digital content storefront receiving said digital content catalog metadata directly from said CDN through a data connection.

15. A process for operating a digital content management system according to claim 13, including the steps of:
determining if metadata requested from said digital content storefront application is not present or up to date in said cached digital content catalog of said CDN, and
if not, said CDN forwarding a data request through a web based connection to said managed datacenter, said managed datacenter then supplying real-time updated catalog metadata to said CDN, and said CDN then using said updated catalog metadata to respond to said request from said digital content storefront application.

16. A process for operating a digital content management system according to claim 13, including the steps wherein said digital content storefront application requests and receives said contextual metadata from said managed datacenter in parallel with requesting and receiving said digital content catalog metadata from said CDN.

17. A process for operating a digital content management system according to claim 13, including the steps of:
calling said context web services by said digital content storefront application to request said contextual metadata, and
said managed datacenter then evaluating configured content targeting rules stored in said managed datacenter to determine and send said contextual metadata to said digital content storefront application.

18. A process for operating a digital content management system according to claim 17, including the steps of storing said content targeting rules in said managed datacenter to provide personalized context for a digital subscriber to filter said digital content catalog based on personalized data about said digital subscriber, and applying said content targeting rules in response to each request from said digital content storefront application.

19. A process for operating a digital content management system according to claim 17, including the steps of:
configuring said digital content catalog by a catalog administration tool operated by said managed datacenter, which creates and updates said managed digital content catalog which is stored on storage media in a digital content database in said managed datacenter; and
transmitting digital content metadata to said cached digital content catalog of each said CDN.

20. A process for operating a digital content management system according to claim 19, including the step of configuring said targeting rules by said catalog administration tool.

21. A process for operating a digital content management system according to claim 13, including the steps of filtering said contextual metadata and said digital content catalog metadata to generate a personalized result set in real-time within said digital content storefront application operated on a processor or in a browser session and visually presenting said personalized result set to said digital subscriber on said access device as said content catalog search results.

22. A digital content management system comprising:
a managed datacenter having server storage which stores a managed digital content catalog containing metadata relating to digital content which may be acquired by a digital subscriber, and stores a digital subscriber attribute database containing personalized information on digital subscribers, said managed digital content catalog and said digital subscriber attribute database respectively being stored on digital storage media and being accessed by respective, computerized managed catalog web services and context web services provided through said managed datacenter;
at least one content delivery network (CDN) configured as a real-time elastic cloud cache remote from said managed datacenter on which is stored a cached digital content catalog that corresponds to said managed digital content catalog and is updated by said managed datacenter, said CDN including catalog web services for processing requests for metadata from said cached digital content catalog, said system comprising either one said CDN provided proximate a particular geographic location to serve all digital subscribers, or multiple said CDNs provided at different geographic locations to locate each said CDN geographically closer to a respective subgroup of said digital subscribers;
at least one computerized access device located remote from but having separate web-based connections with each said CDN and said managed datacenter, said access device having a digital content storefront application which is accessed by a processor of said access device and is usable by a digital subscriber through an input device to perform a personalized contextual search of digital content, said processor of said access device requesting and receiving digital content catalog metadata from said cached digital content catalog through said catalog web services of said CDN, and requesting and receiving contextual metadata about said digital subscriber from said digital subscriber attribute database through said context web services of said managed datacenter;
said processor of said access device receiving said contextual metadata and said digital content metadata from said separate web-based connections and merging said contextual metadata and said digital content catalog metadata to define content catalog search results which are provided to said digital subscriber through said access device.

23. A digital content management system according to claim 22, wherein said processor of said access device directs a data request for said content catalog metadata to one said CDN through a respective first one of said web-based connections depending upon a particular geographic location of said digital subscriber, and a data request for said contextual metadata to said managed datacenter through a respective second one of said web-based connections.

24. A digital content management system according to claim 23, wherein said CDN includes a web-based data connection with said managed datacenter to determine if metadata requested from said digital content storefront application is not present or up to date in said cached digital content catalog of said CDN, and if not present or up to date, said CDN forwarding a data request through said web based connection of said CDN to said managed datacenter wherein said servers of said managed datacenter supply real-time updated catalog metadata to said CDN which said CDN uses said updated catalog metadata to transmit said digital content metadata through said first web-based connection to respond to said request from said digital content storefront application.

25. A digital content management system according to claim 22, wherein said digital content storefront application is provided by a software application or a web site viewed through a browser on a display of said access device.

26. A digital content management system according to claim 22, wherein content targeting rules are stored on server based storage in said managed datacenter and processed in response to said request from said digital content storefront application which said content targeting rules provide personalized context for a digital subscriber.

27. A digital content management system comprising:
a managed datacenter having server storage which stores a managed digital content catalog containing data relating to digital content which may be acquired by a digital subscriber, and stores a digital subscriber attribute database containing personalized information on digital subscribers, said managed digital content catalog and said digital subscriber attribute database respectively being stored on digital storage media and being accessed by respective, computerized managed catalog web services and context web services provided through said managed datacenter;
at least one content delivery network (CDN) configured as a real-time elastic cloud cache remote from said managed datacenter on which is stored a cached digital content catalog that corresponds to said managed digital content catalog and is updated by said managed datacenter, said CDN including catalog web services for processing requests for metadata from said cached digital content catalog;
at least one computerized access device located remote from but having separate web-based connections with each said CDN and said managed datacenter, said access device having a digital content storefront application which is accessed by a processor of said access device and is usable by a digital subscriber through an input device to perform a personalized contextual search of digital content, said processor of said access device requesting and receiving digital content catalog metadata from said cached digital content catalog through said catalog web services of said CDN, and requesting and receiving contextual metadata about said digital subscriber from said digital subscriber attribute database through said context web services of said managed datacenter;
said contextual metadata requested by said digital content storefront application being provided said context web services which process and evaluate configured content targeting rules stored in said managed datacenter to generate said contextual metadata and transmit said contextual metadata to said access device; and
said processor of said access device receiving said contextual metadata and said digital content metadata by two inputs from said separate web-based connections and merging said contextual metadata and said digital content catalog metadata in a real-time contextual merge to define content catalog search results which are provided to said digital subscriber through said access device, said digital content storefront application including a display which allows the digital subscriber to perform and view said personalized contextual search and receive and browse said content catalog search results.

28. A digital content management system according to claim 27, wherein said content targeting rules are stored in said managed datacenter and applied by said managed datacenter in response to said request from said digital content storefront application which said content targeting rules provide personalized context for a digital subscriber to filter said digital content catalog based on personalized data about said digital subscriber using said digital content storefront application.

29. A digital content management system according to claim 28, wherein said targeting rules are processed relative to said digital subscriber attribute database located at said managed datacenter to generate said contextual metadata.

30. A digital content management system according to claim 29, wherein a computerized publishing tool is performed on a processor associated with said managed datacenter to create said managed digital content catalog and issue updates and changes to said cached digital content catalog.

* * * * *